Nov. 21, 1967  F. M. WOOD ET AL  3,354,385
ELECTROMAGNETIC INSPECTION SYSTEM UTILIZING SEARCH
COILS NESTED WITHIN ONE ANOTHER
Filed April 29, 1964
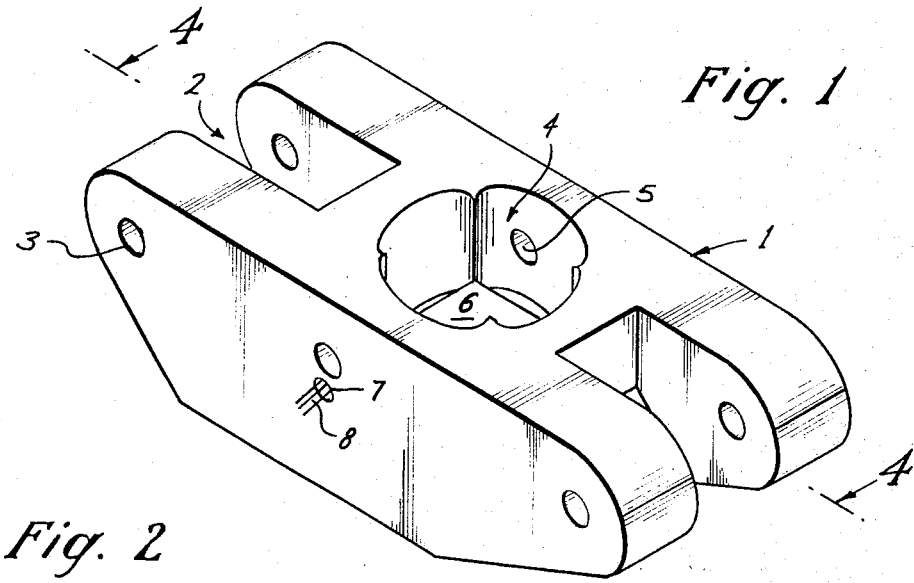
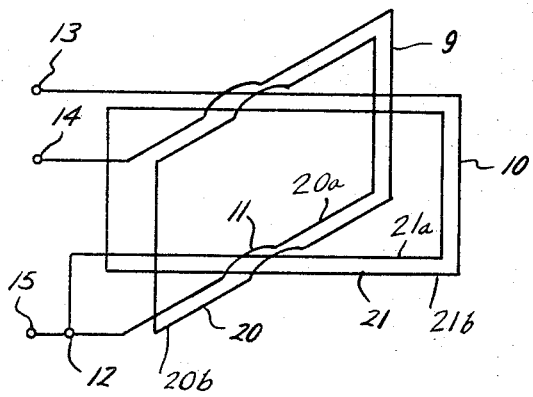
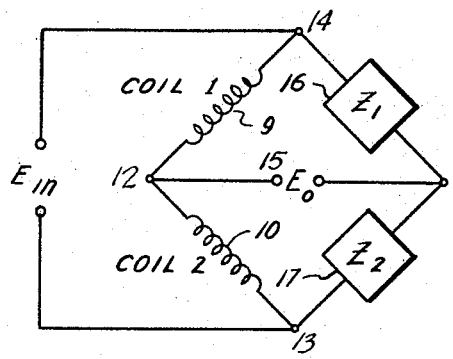
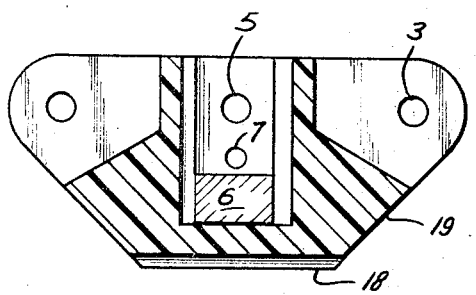
Fenton M. Wood
William T. Walters
INVENTORS
BY
*Arnold and Roylance*
ATTORNEYS

United States Patent Office 3,354,385
Patented Nov. 21, 1967

3,354,385
ELECTROMAGNETIC INSPECTION SYSTEM UTILIZING SEARCH COILS NESTED WITHIN ONE ANOTHER
Fenton M. Wood, Sugarland, and William T. Walters, Houston, Tex., assignors to American Machine and Foundry Company, New York, N.Y., a corporation of New Jersey
Filed Apr. 29, 1964, Ser. No. 363,569
3 Claims. (Cl. 324—37)

This invention relates to flaw detection by electromagnetic inspection, and more particularly to such inspection utilizing a pair of search coils for operating with an electronic bridge circuit.

Electromagnetic inspection of articles, such as tubular pipe used in the oil and gas industry for the transporting of oil field products, has been performed in the past using inspection coils of various configurations. Many of these are illustrated in Knerr et al. 2,124,579.

Search coils have been connected to operate in numerous electronic circuits. Among the most successful circuits that have been used for electromagnetic inspection have been various bridge arrangements, an example of which is shown in Hochschild 3,056,081.

Typically, such coils have been individually mounted in separate mounting fixtures, called "shoes," for passing over the surface of the conductive material to be inspected. However, since it is often desirable to have an appropriately matched set of coils for successful bridge operation, the individually mounted coils must be carefully selected. Such selection is time-consuming and uneconomical. Also, when coils are mounted individually it is impossible to pass the two coils over the same area of the inspected material simultaneously, which is often necessary, or at least highly desirable, for successful bridge operation.

The present invention provides a device in which matched coil pairs are permanently sealed together in a package that allows the two coils to be passed over the inspected surface simultaneously.

The embodiment of the invention described herein is a search coil assembly adapted to be enclosed in a mounting device and connected to an electronic bridge circuit and used in the inspection of conductive articles, comprising An inspection shoe to be used for moving over an area of conductive material to be inspected, A first search coil mounted in the inspection shoe aligned on edge so that the plane defined by the edges of the coil is approximately perpendicular to the surface to be inspected, thereby presenting only a single coil side to the inspected surface, and A second search coil mounted in the same inspection shoe and similarly aligned on edge, but at an angle to the first coil so as to intersect the flux from the inspected surface at a different angle.

Basically, the illustrated embodiment described herein is an inspection shoe having a block with two coils imbedded therein, the coils being aligned substantially at right angles, and positioned on edge so that the plane of the openings defined by the turns of coils is perpendicular to the surface to be inspected. As shown, the major axis of each coil is parallel to the surface of the material and the minor axis is perpendicular to the surface. This configuration enables the coils to be swept over a very small area of the surface at any instant of time so as to detect very small surface discontinuities, such as quench cracks, splits and the like, that disturb the eddy current flow pattern in a very limited area of the material. The eddy current disturbances are reflected as impedance changes in a related bridge circuit.

The two coils are crossed at a central location, insulated from one another, so that at the center the coils pass over the same area on the inspected material simultaneously. Such an arrangement eliminates the costly duplication of shoes capable of containing only a single coil.

Also, by combining the two coils of a single balanced bridge circuit into the same inspection shoe, irregular pipe surfaces that cause the shoe to lift away from the inspected material do not cause large noise signals in the related electronic recording and detection system that might hide true flaw signals or that might be mistaken for true flaw signals.

In order that the invention can be understood in detail, reference is made to the accompanying drawings, which form a part of this specification, and wherein:

FIGURE 1 is an oblique view of an inspection shoe in which the illustrated embodiment of this invention is mounted.

FIGURE 2 is a side view of the coil arrangement of the illustrated embodiment of this invention.

FIGURE 3 is a schematic diagram of a typical bridge arrangement showing the coils of the illustrated embodiment connected therein.

FIGURE 4 is a section view of the illustrated embodiment taken at line 4—4 of FIG. 1.

In order for detecting search coils used in electromagnetic inspection to be swept across the surface of a conductive material to be inspected, they may be mounted conveniently in what is called a "shoe" or shoe assembly. One such assembly 1 found to be a successful shape is shown in FIG. 1. A description of the apparatus in which such an assembly is used is found in our copending application, Device for Inspecting Upset Area of Tubular Members, No. 363,559, filed Apr. 29, 1964, now Patent No. 3,327,206, issued June 20, 1967.

As described therein, legs for attaching the shoe assembly 1 to the remainder of the apparatus are inserted into mounting openings 2 and pins are inserted transverse of the openings and through the legs and holes 3, thereby pivotally attaching the legs in place.

A cavity is provided in the top surface of the shoe assembly to accommodate a spring-mounted guide rod secured by a transverse mounting pin inserted through the rod and holes 5 located at either side of the cavity of the shoe assembly.

The coil assembly body 6 fits snugly into shoe cavity 4 so that when it is fully seated in its lowest position, the top surface of the coil assembly body is below the opening 7. Conductors 8 extending from the coil assembly body 6 extend through opening 7 to be connected externally to the related electronic inspection circuit.

FIG. 2 is a diagram of the coils imbedded in the coil assembly block. Only two turns of wire are shown for each coil, although it will be understood that any number of turns may be used that is convenient to operate with the remainder of the electronic circuit.

In this embodiment, it is seen that the coil 10 defines a 4-sided coil wherein the side nearest the pipe to be inspected, in the customary operating position, is a straight portion designated as side 21. Said four sides, circumscribe an open loop, of course defining a plane. One part of this loop constitutes the straight portion 21. As is readily seen, the side 21 includes two wires 21a and 21b. The wire nearest the inspected pipe, in this case 21b, defines an edge of the coil 10. Since in the customary operating position this edge is nearest the inspected pipe, the edge 21b will sometimes be referred to herein as the lower edge.

The coil 9 is, in this embodiment, of similar construction; side 20 corresponds to side 21 of coil 10, and edge 20b corresponds with edge 21b of coil 10.

As pointed out above, the coils 9 and 10 could be constructed of any suitable number of turns. In each instance, however, it is readily understood that a lower edge would be defined by the wire or wires nearest the inspected pipe.

It is further readily seen in the illustrated embodiment that each of the sides 20 and 21 and the edges 20b and 21b are aligned generally parallel to the surface of the elongated pipe being inspected. That is, the straight portions of each coil are in a common plane, which plane is substantially parallel to a tangential plane passing through the points on the elongated pipe which are nearest the coil assembly.

The plane defined by the complete coil is generally perpendicular to such side and to the surface of the inspected pipe. And, as seen in FIGURE 2, the planes of coils 9 and 10 are nonparallel. In this embodiment, such coils are positioned at the preferred 90-degree angle.

The placement of the two coils so that they are in planes at right angles to one another increases the reliability of detecting all flaws that might be present. Flaws are most commonly aligned or oriented either longitudinally or transversely to the longitudinal axis of the measured pipe. Therefore, these two chief types of flaw alignments disturb the flux pattern established in the material in such a manner that should a flaw go undetected by one coil, the other coil would certainly detect it.

Also, the placement of the coils on edge greatly enhances the possibility of detecting minute flaws whether they be in large numbers, as in a crazed surface, or singularly, as in a forging crack.

Since a single shoe assembly comprises both coils of a single balanced bridge, any tendency the shoe might have to lift away from the surface of the inspected material, whether by an irregular surface or for any other reason, does not materially interfere with related electronic detecting and recording circuits. When singularly mounted coils are used, the lift-off of one coil without the lift-off of the other coil causes a signal response that is often mistaken for a flaw or that hides a flaw. By contrast, the impedance changes of coils mounted together operating as a matched pair in a bridge compensate for one another as the coils are lifted off together, thereby causing little, if any, spurious signal.

Since it is necessary to keep the two coils closely matched, they are approximately the same physical dimension, or the effective area encompassed by the coils are almost identical. Another critical dimension that is kept essentially identical is the distance from the sides of the coils to the surface of the inspected pipe when the coil assembly block is in its position of use. This means that sides 20 and 21 of coils 9 and 10 are in a single plane perpendicular to the planes defined by the coils themselves and parallel to a tangent plane passing through the point on the measured pipe directly beneath the coil assembly.

The coils being the same dimension and with a respective side located in a common plane means that there must be some means for modifying the shape of one or both of the coils at the junction crossing. It has been found that only one of the coils need to be modified slightly. In the drawing, junction crossing 11 is formed by crimping the coil side 20 of coil 9 so that it crosses over coil side 21 of coil 10. Of course, sides 20 and 21 are electrically insulated from one another. By establishing the crimp, the area inside coil 9 is made slightly smaller than the area inside coil 10.

The normal connection requirements of coils 9 and 10 require that they be joined together at a common point. In the drawing, this is at center connection 12. This means that there are only three terminal connections from the combined coil arrangement of coils 9 and 10, viz. 13, 14, and 15. Conductors 8 are attached to these terminal connections.

It should be noted that in the drawing although only three terminal connections are shown, that should it be desirable for a particular application, four terminal connections can be brought out. This would mean that there would be no center connection 12 and that each coil would have its respective ends terminating in terminal connections.

The whole assembly is sealed in a unit to maintain the close tolerances necessary for successful operation. This assembly forms the coil asembly body 6 in the drawings.

Coils 9 and 10 may be connected in an electronic circuit as shown in FIG. 3. Coils 9 and 10 form two legs of an impedance bridge with impedances 16 and 17 forming the other two legs. Impedances 16 and 17 can be made variable so that when an oscillator signal is applied at E$in$, the bridge can be balanced by measuring the value at E$o$.

Also notice that in the legs comprising coils 9 and 10, series and parallel circuit elements may be inserted to change the value of the legs and therefore change the balance of the bridge. This might be desirable to make the bridge more sensitive (for instance, by using the turns ratio of a transformer connected to an inspection coil) or to modify the impedance slightly to balance the bridge (for instance, to make allowance for the slight change in dimension occasioned by the forming of junction crossing 11 in coil 9).

FIG. 4 shows a cross section of the shoe assembly shown in FIG. 1 taken longitudinally through the center. As is shown, surrounding the cavity 4 in which the coil assembly body 6 is placed, is a packing or cushioning material 19. This material is of neutral conductivity so that it in no wise shields or distorts the magnetic field being emitted from the inspected material, but does protect the coils from shock.

It should also be noted that there is a recess 18 in the shoe assembly located beneath the coil assembly body 6. This recess means that the harder material making up the bulk of the shoe (which also must be of neutral conductivity) absorbs the wear of the shoe riding on the surface of the pipe material rather than the cushioning material 19, which might be much less wear resistant. This arrangement also has the effect of keeping the coils at a uniform distance from the pipe, particularly when in the process of detecting a flaw, by tracking at a wider distance than just at the point where the flaw occurs.

Other coil arrangements can be used instead of the one illustrated embodiment. For instance, in some applications it may be desirable to align the two coils so that they are at some other angle than 90 degrees with respect to one another. Also, in some applications, it may be desirable to place more than two coils in a single shoe. These and various other embodiments can be devised by those having ordinary skill in the art without departing from the scope of the invention. The limits of this invention, therefore, are more clearly defined in the appended claims.

What is claimed is:

1. An electronic search coil assembly suitable for use in the flaw inspection of a conductive elongate tubular member, comprising:

an inspection shoe positioned adjacent the exterior surface of said member, adapted to be moved relative to said surface, a first search coil mounted in said inspection shoe, said coil circumscribing at least a first open loop, said loop substantially defining a planar coil face, one part of said loop constituting a straight portion, and a second search coil mounted in said inspection shoe in nesting relationship with said first coil, said coil circumscribing at least a second open loop of approximately the same size as said first loop, and said second loop also substantially defining a second planar coil face, one part of said second loop constituting a straight portion, said straight portion of said first loop and said straight portion of said second loop being disposed in a common plane which is substantially parallel to a tangential plane passing through the points on said conductive member nearest said coil assembly, the face of said first loop intersecting the face of said second loop, and means to energize said first and second search coils to thereby induce flux into the surface of said conductive member, whereby flux emanating from the conductive member intersects said first coil face at a different angle from the angle with which said flux intersects said second coil face.

2. An electronic search coil assembly in accordance with claim 1, wherein said first coil crosses said second coil forming at least one junction point, said junction point being insulated so that there is no electrical connection between said first and second coils at said junction point.

3. An electronic search coil assembly in accordance with claim 1, wherein the plane of said first loop is approximately perpendicular to the plane of said second loop.

References Cited

UNITED STATES PATENTS

| 2,267,884 | 12/1941 | Zuschlag | 324—40 |
| 2,317,721 | 4/1943 | Barnes | 324—37 |
| 2,790,140 | 4/1957 | Bender | 324—37 |
| 2,838,732 | 6/1958 | Brown | 324—34 |
| 3,001,130 | 9/1961 | McClurg et al. | 324—37 |
| 3,035,353 | 5/1962 | Hovemeyer et al. | 324—34 |
| 3,241,057 | 3/1966 | Rall | 324—34 |

RUDOLPH V. ROLINEC, *Examiner.*

RICHARD B. WILKINSON, WALTER L. CARLSON, *Examiners.*

R. J. CORCORAN, *Assistant Examiner.*